B. F. CATHCART.
ROTARY PUMP.
APPLICATION FILED JAN. 23, 1913.

1,076,627.

Patented Oct. 21, 1913.

WITNESSES
Edward Thorpe,
B. Joffi

INVENTOR
Benjamin F. Cathcart,
BY Munn & Co
ATTORNEYS

UNITED STATES PATENT OFFICE.

BENJAMIN FRANKLIN CATHCART, OF FRESNO, CALIFORNIA.

ROTARY PUMP.

1,076,627.　　　　Specification of Letters Patent.　　Patented Oct. 21, 1913.

Application filed January 23, 1913. Serial No. 743,746.

*To all whom it may concern:*

Be it known that I, BENJAMIN F. CATHCART, a citizen of the United States, and a resident of Fresno, in the county of Fresno and State of California, have invented a new and Improved Rotary Pump, of which the following is a full, clear, and exact description.

The invention relates to improvements in rotary pumps, and has reference more particularly to the class comprising a stator having an inlet and an outlet, and a rotor within the stator, between the inlet and the outlet, having a plurality of blades and flanged heads integral with the ends of the blades, and an opening in the heads establishing communication between the inlet and the outlet of the rotor.

An object of the invention is to provide an inexpensive, simple and efficient rotary pump in which the pressure necessary for raising the water is obtained by providing inlets in the rotor of a reduced diameter, lying between the inlet and outlet of the stator.

Reference is to be had to the accompanying drawings forming a part of this specification, in which similar characters of reference indicate corresponding parts in both the views.

Figure 2:
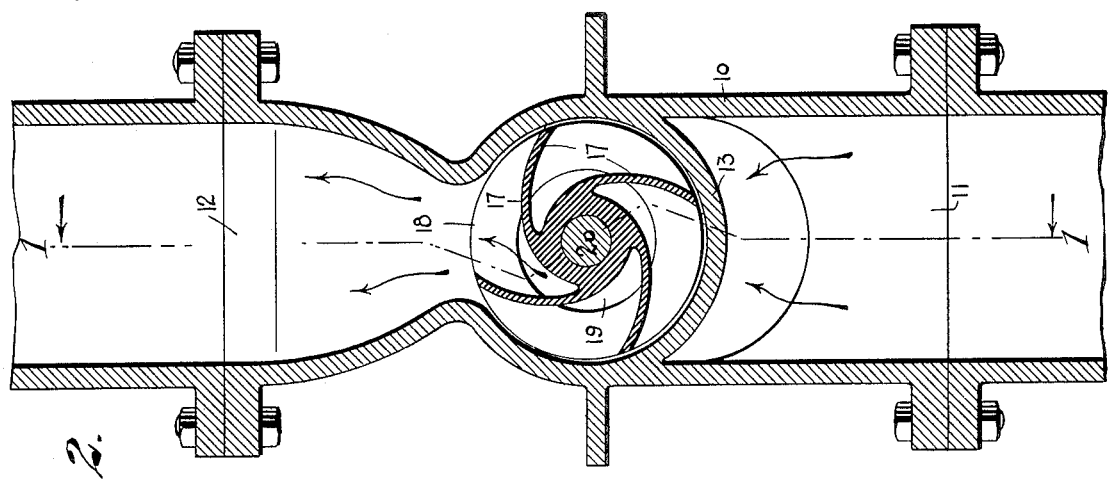
Figure 1:
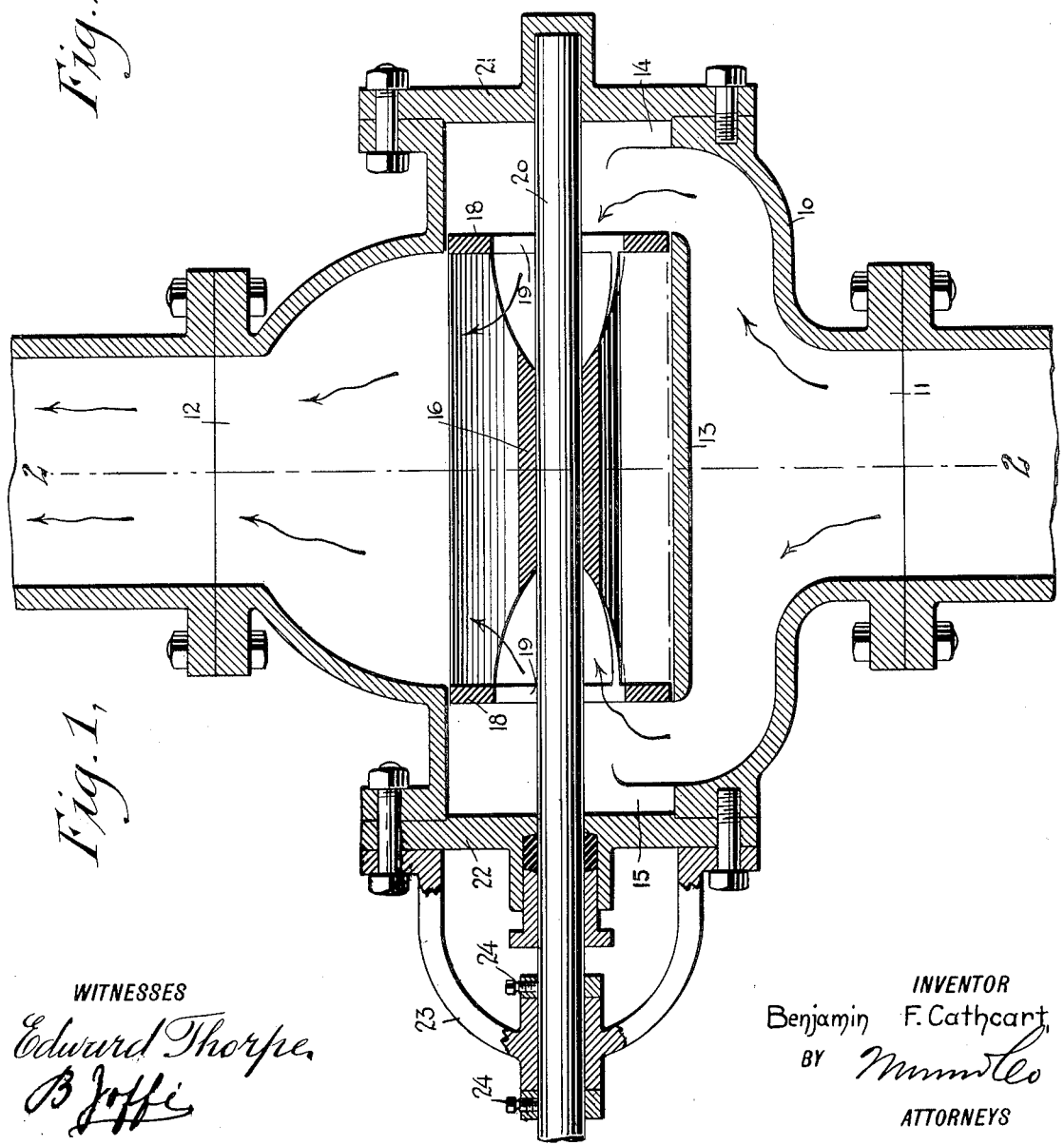

Figure 1 is an elevated central section through an embodiment of my invention; and Fig. 2 is a vertical cross section through the same, on the line 2—2 of Fig. 1.

Referring to the drawings, 10 indicates the casing or the stator, provided with an inlet 11 and an outlet 12. Cast integrally with the casing is a central circular portion 13 forming a cylinder open at the ends, and on its lateral surface, opposite the outlet 12 of the casing, the end openings of the cylindrical portion 13 being axial with the end openings 14 and 15 of the casing. In the cylindrical portion 13 is a uniform cylindrical rotor 16 having a plurality of blades 17, cast integrally with flanges 18 constituting the ends of the rotor, and fitting snugly into the cylindrical portion, the diameter of the blades being equal to that of the flanges and the blade elements being parallel to the elements of the cylinder formed by the flanges and the edges of the blades. The length of the rotor 16 is the same as the length of the cylindrical portion 13, and the width of the flanges is such that the distance between said flanges, or the length of the blades, is the same as the length of the lateral opening of the cylindrical portion 13. The flanged portions 18 constituting the heads of the rotor, are each provided with a central opening 19, the blades 17 being partly cut away near the openings 19 so as to afford a better entrance to the fluid when the rotor is propelled by means of the shaft 20, to which the rotor 16 is rigidly secured. The shaft 20 has its bearings in the end flanges 21, 22, engaging the openings 14 and 15 of the stator.

A stuffing box is provided in the end flange 22 to prevent leakage through the central opening for the shaft 20, the end flange 21 having the bearing for the shaft closed so that no leakage will occur at this end. A bracket 23 is associated with the end flange 22, constituting an additional bearing for the shaft 20, and at each side of the bearing of the bracket 23 stop rings 24 are provided which prevent the shaft 20 from lateral displacement when rotating. When the rotor 16 is rotated, the water entering through the inlet 11 of the stator is directed to the side passages toward the heads 18 of the rotor, and thereby through the impelling motion of the blades the water is carried through the openings 19 toward the outlet 12 of the stator.

It can be seen from the drawings that the openings 19 are each smaller in diameter than the inlet 11. It must be remarked that without the end flanges 18, the rotor 16 will not force any water toward the outlet 12, so that the reduction of the inlet by means of the addition of the end flanges 18 helps the rotor to raise the liquid. The flanges 18 may be made integral with the casing 10, and the blades 17 of the rotor will then rotate between them.

Having thus described my invention, I claim as new and desire to secure by Letters Patent:

In a rotary pump, a stator having an inlet, an outlet and a cylindrical portion open at its ends and positioned intermediate the inlet and the outlet, said stator having end openings in alinement with the openings of said cylindrical portion; a uniform cylindrical rotor adapted to pass through said openings in the stator and engaging said cylindrical portion, said rotor comprising a plurality of curved blades; end flanges integral with the blades all fitting snugly into the cylindrical portion with the flanges at the ends of the cylindrical portion, said flanges closing the ends of the cylindrical portion and having central apertures therethrough, said cylindrical portion having a lateral opening registering with the outlet of the stator; a shaft carrying said rotor; heads engaging said end openings in the stator and forming bearings for said shaft, substantially as and for the purpose set forth.

In testimony whereof, I have signed my name to this specification in the presence of two subscribing witnesses.

BENJAMIN FRANKLIN CATHCART.

Witnesses:
GERTRUDE DREW,
CATHRINE CATHCART.